United States Patent [19]
Price et al.

[11] 3,734,323
[45] May 22, 1973

[54] SPARE TIRE LIFT AND HOLDER FOR A PICKUP TRUCK AND THE LIKE

[76] Inventors: Wayne E. Price, 401 S. Chickasaw, Pauls Valley, Okla. 73075; William L. Waldrup, Route 4, Elmore City, Okla. 73035

[22] Filed: Feb. 22, 1972

[21] Appl. No.: 227,853

[52] U.S. Cl. .................................................. 214/451
[51] Int. Cl. ............................................. B62d 43/04
[58] Field of Search ...................................... 214/451

[56] References Cited

UNITED STATES PATENTS

| | | | |
|---|---|---|---|
| 3,395,819 | 8/1968 | Fruetel | 214/451 |
| 3,539,152 | 11/1970 | Paul | 214/451 |
| 3,372,821 | 3/1968 | Podhajsky | 214/451 |

*Primary Examiner*—Gerald M. Forlenza
*Assistant Examiner*—Kenneth Noland
*Attorney*—Robert K. Rhea

[57] ABSTRACT

A crank rod extends horizontally through the rear bumper and a pair of body frame members which are spaced-apart a distance less than the diameter of the spare tire. A cable is secured, at one end, to the crank rod between the pair of frame members and is removably connected at its other end to the wheel of a spare tire. Rotation of the crank rod winds the cable therearound by a cable guide means and lifts the wheel and tire assembly to a horizontal stored position in which the tire resiliently abuts the depending limit of the pair of frame members. Ratchet means, engaging the outwardly disposed end of the crank rod, locks or releases the crank rod.

6 Claims, 5 Drawing Figures

Patented May 22, 1973 3,734,323

3,734,323

SPARE TIRE LIFT AND HOLDER FOR A PICKUP TRUCK AND THE LIKE

BACKGROUND OF THE INVENTION

1. Field of the Invention.

The present invention relates to spare tire holders and more particularly to a spare tire holder for pickup trucks.

Pickup truck spare tire mountings are usually positioned at the rearward depending end portion of the pickup truck body and frame between the limits of the frame side members. This disposes the mounting in a somewhat inaccessible position particularly when the vehicle is in use on unpaved roads and during inclement weather and are difficult to operate because of the mounting position and the limited space between the surface of the earth and the depending surface of the vehicle. It is, therefore, desirable that a mounting means be provided which will permit the spare tire and wheel to be released from its stored position and moved to a position rearwardly of the vehicle without requiring the operator to crawl, at least partially under the truck to release the spare tire.

2. Description of the Prior Art

Spare tire mounting means for holding a spare tire below the frame of a pickup truck, as shown by the prior patents, generally comprise a winch and cable as in U.S. Pat. Nos. 3,372,821 and 3,390,864 or may include pulleys around which the cable is entrained as in U.S. Pat. Nos. 3,542,413 and 3,554,397.

The principal distinction of this invention over these patents and other patents is the minimal modification of existing components required for installing this invention and its simplicity of operation.

SUMMARY OF THE INVENTION

An elongated crank rod is horizontally extended through the rearward bumper and a pair of transverse frame cross members. A cable is connected at one end to the crank rod between the cross members and hangs freely downward at its other end portion for removable connection with the wheel of a spare tire. Lug nut and ratchet means, connected, respectively, with the end of the crank rod and bumper, permit rotating the crank rod in releasing or storing the spare tire and locking it in place.

The principal object of this invention is to provide a spare tire lift and holder having the control therefor positioned on the pickup bumper laterally of its license plate and trailer hitch position.

DESCRIPTION OF THE PREFERRED EMBODIMENT

Figure 1:
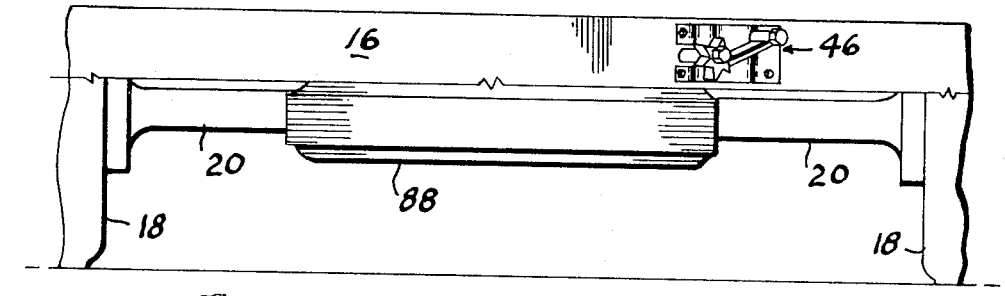
FIG. 1 is a fragmentary rear end elevational view of the pickup truck illustrating a spare tire and wheel in stored position.

Like characters of reference designate like parts in those figures of the drawings in which they occur.

In the drawings:

The reference numeral 10 indicates the rearward end portion of a pickup truck frame comprising longitudinal side members 12 and 14 connected with a rear bumper 16. The frame 10 is supported by a pair of wheels 18 interconnected by axle housings 20 in a conventional manner. The bumper 16 is of the economy type, substantially z-shaped in cross section (FIG. 3), having an upper vertical leg portion 22 and a depending vertical leg portion 24 interconnected by a horizontal intermediate or ledge portion 26. The depending leg portion 24 is turned arcuately inward and the horizontal or ledge portion 26 is cut away, medially the length of the bumper, to form a license plate and light holding recess 28 and including a horizontal rearwardly projecting plate 30 having an aperture 32 for mounting a trailer hitch ball, not shown, thereon. The frame 10 further includes a pair of cross members 34 and 36 extending transversely between the frame side members 12 and 14 in parallel spaced relation forwardly of the bumper 16. The spacing between the cross members 34 and 36 is usually greater than the diameter of the vehicle wheel but less than the diameter of the tire mounted thereon. The spacing between the frame side members 12 and 14 is greater than the overall diameter of the vehicle wheel and tire.

Figure 2:
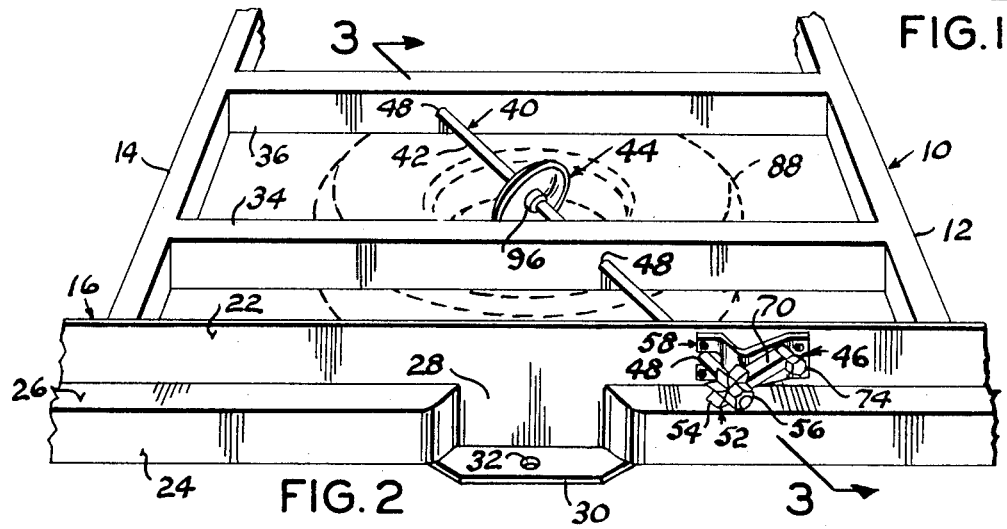
FIG. 2 is a fragmentary perspective view illustrating the relative position of the device when installed on a pickup truck bumper and frame members, the spare tire and wheel being shown by dotted lines.

The reference numeral 40 indicates the device, as a whole, comprising a crank rod 42, a cable guide 44 and ratchet means 46. The crank rod 42 is elongated having a length greater than the spacing between the rearward outer surface of the bumper leg 22 and a vertical plane taken through the forward frame cross member 36. An aperture 48 is formed, respectively, in the frame cross members 34 and 36 and upper vertical leg 22 of the bumper in aligned relation and extending angularly forward on an acute angle with respect to the longitudinal center line, not shown, of the vehicle frame. The crank rod preferably extends forward from a point in the bumper off-set from its license plate position 28, forward toward the right, as viewed in FIG. 2, toward the left fame side member 14 so that the axis of the crank rod intersects a vertical axis taken through the center of the horizontal plane defined and encompassed by the frame side members 12 and 14 and frame cross members 34 and 36. The forward end portion of the rod is secured in place by a set screw connected collar or bushing 50 to prevent rearward axial movement of the crank rod.

The ratchet means 46 includes a gear wheel or ratchet wheel 52 having a plurality of circumferentially spaced teeth 54 with the ratchet wheel coaxially secured to the rearward end portion of the crank rod 42 in spaced relation with respect to the upstanding bumper leg 22. A lug nut 56 is secured to the rearward end of the crank rod rearwardly of the ratchet wheel 52.

A bracket 58, comprising a vertically edgewise disposed length of strap iron, or the like, has one end portion thereof bifurcated to form a slot 60 loosely surrounding the rearwardly projecting end portion of the crank rod and in contact with the rearward surface of the bumper leg 22. A portion 62 of the bracket 58 extends rearwardly parallel with respect to the axis of the crank rod a distance substantially equal to the spacing between the upstanding bumper leg 22 and the adjacent surface of the ratchet wheel 52. The remaining portion of the bracket 58 extends angularly, to the right as viewed in the drawings, toward the surface of the bumper leg 22, as at 64, and terminates in an end portion 66 flatly contacting the bumper leg 22. Apertures 68, formed in the respective end portions of the bracket, receive bolts, or the like, for connecting the bracket to the bumper leg.

A pawl 70 is secured at one end to a sleeve 72 which loosely surrounds a bolt 74 extending through and secured to the bracket portion 64 adjacent its end portion 66 for vertical pivoting movement of the other end portion of the pawl about the horizontal axis of the bolt 74. The length of the pawl 70 is slightly greater than the spacing between the axis of the bolt 74 and the ratchet wheel surface between its teeth 54 so that the free end of the pawl engages a selected one of the ratchet teeth and prevents rotation of the control rod 42 about its longitudinal axis, however, the pawl 70 is freely movable, as for example, downwardly so that the ratchet teeth may rotate without contact with the pawl for the reasons presently explained.

An elongated flexible element, such as a cable 76, is secured at one end to the control rod 42, preferably medially the spacing between the frame cross members 34 and 36, and hangs freely downwardly at its other end portion from the horizontal plane of the vehicle frame 10. The other end of the cable 76 is connected to a link 78, or the like, in turn secured to a flange 80 joined to a substantially rectangular plate 82. The length of the plate 82 is slightly greater than the diameter of a brake housing receiving opening 84 formed in the vehicle spare wheel 86 having a spare tire 88 mounted thereon. The width of the plate 82 is substantially less than the diameter of the wheel opening 84. The respective end portions of the lifting plate 82 are arcuately turned laterally in a cooperating direction, as at 90, with the respective free end thereof bifurcated to form foot portions 92 lying in a common plane. The respective foot portions 92 contact the brake housing engaging portion of the wheel defined by the lug bolt receiving openings 94.

The cable guide means 44 comprises a disk member having a diameter at least as great as the vertical limit of the frame cross members 34 and 36 and having a hub 96 coaxially receiving the control rod for securing the disk thereto adjacent the connected portion of the cable 76. The disk 44 is further characterized by its outer peripheral edge being turned to extend arcuately rearward, as at 98, to form a cup-shape for the disk wherein the arcuate surface provides a bearing surface for sliding movement of the cable 76.

OPERATION

In operation the device 40 is installed on the vehicle frame and bumper 10 as described hereinabove. For storing the spare wheel and tire, the lifting plate 82 is inserted downwardly through the wheel opening 84 when the wheel is horizontally positioned on the surface of the earth rearwardly of the vehicle. A lug wrench, or the like, not shown, is engaged with the lug nut 56 and with the ratched pawl 70 pivoted to an inactive position, away from the ratchet teeth 54, the control rod 42 is rotated about is longitudinal axis, for example, to the right, as viewed in the drawings, which winds the cable 76 around the control rod forwardly of the guide means 44 which pulls the spare tire and wheel along the surface of the earth until it is coaxially aligned with the rod connected end portion of the cable wherein continued rotation of the control rod lifts the spare tire and wheel vertically toward the depending surfaces of the frame cross members 34 and 36. When the tire 88 contacts the depending surfaces of the cross members the cable is placed under tension and the pawl is engaged with one of the ratchet teeth 54 thus preventing an unwinding or releasing action of the cable which stores the spare wheel and tire against the frame members 34 and 36. The resilience of the spare tire maintains the tension on the cable.

It is usually desired to lock the stored spare tire and wheel against unauthorized removal which may be accomplished by securing a lug 100 to the pawl which is flatly contacted by the bracket portion 64 and is cooperatively apertured therewith for receiving the U-bolt 102 of a lock 104.

The spare tire and wheel is removed from its stored position by removing the lock 104, if used, engaging a lug wrench with the lug nut 56 to apply a torque to the control rod so that the pawl may be released from engagement with the ratchet teeth 54, thereafter the control rod is rotated to the left or opposite direction from its wound-up position thus unwinding the cable 76 to lower the spare tire and wheel to the earth with an additional length of cable being unwound from the control rod to permit movement of the spare wheel and tire as by manually dragging it to an accessible position rearwardly of the vehicle.

Figure 3:
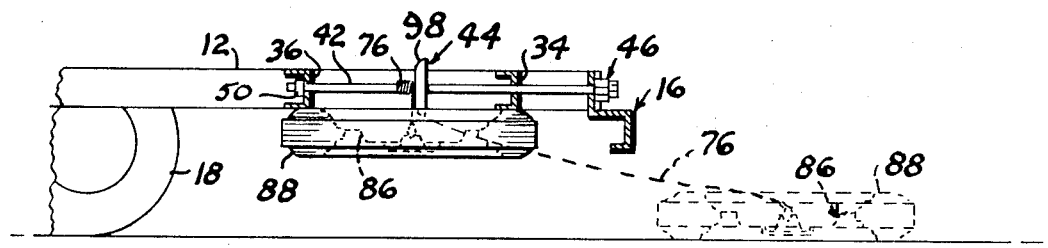
FIG. 3 is a fragmentary vertical cross-sectional view, to a smaller scale, taken substantially along the line 3—3 of FIG. 2, and illustrating, by dotted lines, the relative position of a spare tire before being lifted to a stored position.
Figure 4:
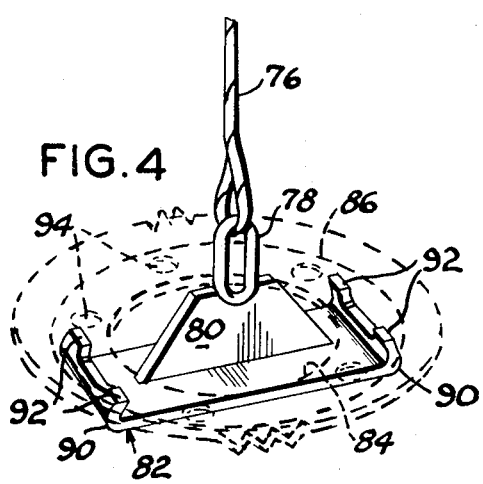
FIG. 4 is a fragmentary perspective view, to a larger scale, illustrating the manner of connecting the cable to a spare wheel and tire, a fragment of the wheel being shown by dotted lines; and, FIG. 5 is a perspective view, to another scale, of the crank rod ratchet engaging means, per se, and illustrating one manner of locking the ratchet means, the lock being shown by dotted lines.
Figure 5:
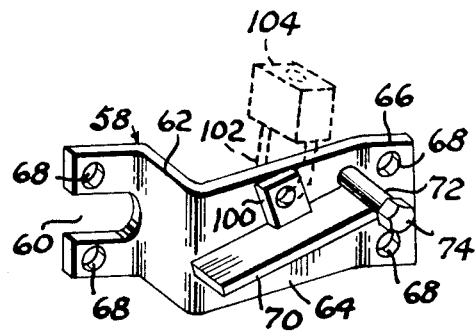

It seems evident that the control rod 42 may extend angularly forward through the bumper 16 and the frame members 34 and 36 from the opposite side of the license plate recess from that shown in the drawings with the ratchet means 46 inverted from the position shown in FIGS. 1, 3 and 5, if desired. This will result in the pawl 70 engaging the ratchet teeth 54, by gravity, which provides the added feature of maintaining the ratchet means in locked position thus preventing an unwinding of the cable 76 in the event of a decrease in pressure within the tire 88 wherein the tension on the cable 76 is lost. Furthermore, the control rod may extend forwardly through the bumper and frame cross members parallel with respect to the longitudinal centerline of the vehicle frame 10, if desired.

Obviously the invention is susceptible to changes or alterations without defeating its practicability, therefore, we do not wish to be confined to the preferred embodiment shown in the drawings and described herein.

We claim:

1. A spare tire and wheel holder for a vehicle having a
    body provided with a pair of horizontal substantially parallel frame members depending from the underside thereof, the length of the frame members being at least as great as the diameter of the spare tire and wheel and being spaced apart a distance at least equal to the diameter of the wheel, comprising:

an elongated crank rod rotatably extending horizontally through said pair of frame members,
one end portion of said crank rod projecting through and terminating adjacent an outer side of said vehicle;

a nut coaxially secured to the end of said one end portion of said crank rod for receiving a crank for rotating said crank rod;

ratchet means interposed between said nut and said one side of the vehicle and engaging said crank rod and normally limiting rotation thereof in one direction;

an elongated flexible element wound around said crank rod with one end secured thereto between said pair of frame members and the other end portion hanging downwardly freely between said frame members;

spare wheel engaging means secured to the depending end of said flexible element; and, guide means secured to said crank rod between said pair of frame members.

2. The spare tire and wheel holder according to claim 1 in
which said vehicle is provided with a rear bumper and said crank rod extends forwardly through said rear bumper and said pair of frame members at an acute angle with respect to a vehicle longitudinal center line taken through said pair of frame members, the axis of said crank rod intersecting the vehicle longitudinal center line medially the spacing between said pair of members.

3. The spare tire and holder according to claim 2 in which said ratchet means includes:

a ratchet wheel coaxially secured to the rearward end portion of said crank rod adjacent said rear bumper, said ratchet wheel having a plurality of radially projecting teeth;

a bracket secured to said rear bumper adjacent said ratchet wheel; and, a pawl pivotally connected at one end with said bracket and releasably engaged at its other end between said ratchet teeth.

4. The spare tire and wheel according to claim 3 in which
said guide means includes:

a cup-shaped disk coaxially secured to said crank rod rearwardly adjacent the connection of said flexible element with said crank rod,
the radius of said disk being at least as great as the spacing between the axis of said crank rod and the horizontal plane defined by the depending limit of said pair of frame members,
the peripheral edge portion of said disk being arcuately curved rearwardly and forming a friction reducing bearing surface when engaged by said flexible element in a longitudinal sliding action.

5. The spare tire and wheel holder according to claim 4 in
which said wheel is provided with a wheel hub receiving opening and said engaging means includes:

an elongated plate having a length at least greater than the diameter of said hub receiving opening and having a transverse width less than the diameter of said hub receiving opening,
said plate having its respective end portions cooperatively turned arcuately laterally equidistant in the same direction,
each laterally turned plate end surface being bifurcated to form flat foot surfaces lying in a common plane.

6. The spare tire and wheel holder according to claim 5 and further including:

an apertured lug secured to said pawl for locking said pawl in ratchet teeth engaging position.

* * * * *